(12) United States Patent
Awasare et al.

(10) Patent No.: US 12,395,039 B2
(45) Date of Patent: Aug. 19, 2025

(54) FLUID PUMP

(71) Applicant: MAHLE INTERNATIONAL GMBH, Stuttgart (DE)

(72) Inventors: Alok Awasare, Pune (IN); Martin Gross, Kämpfelbach (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 277 days.

(21) Appl. No.: 18/210,244

(22) Filed: Jun. 15, 2023

(65) Prior Publication Data

US 2023/0412036 A1 Dec. 21, 2023

(30) Foreign Application Priority Data

Jun. 20, 2022 (DE) .......................... 102022206140.3

(51) Int. Cl.
*H02K 5/20* (2006.01)
*F04D 13/06* (2006.01)
(Continued)

(52) U.S. Cl.
CPC ............. *H02K 5/203* (2021.01); *F04D 13/06* (2013.01); *F04D 29/18* (2013.01); *F04D 29/586* (2013.01);
(Continued)

(58) Field of Classification Search
CPC .......... H02K 5/203; H02K 5/04; H02K 7/083; H02K 9/19; H02K 11/33; H02K 21/16; H02K 7/14; H02K 5/10; H02K 9/06; F04D 13/06; F04D 29/18; F04D 29/586; F04D 29/026; F04D 29/08; F04D 29/5806; F04D 29/5813; F04D 29/086; F04D 29/2205; F04D 29/445; F04D 13/08; F04D 13/0606; F04D 29/22; F04D 29/426; H01M 8/04029; H01M 8/2465; H01M 2250/20;
(Continued)

(56) References Cited

U.S. PATENT DOCUMENTS 4,722,661 A 2/1988 Mizuno
7,290,937 B2 * 11/2007 Takumi ................. F04D 29/047
384/909
(Continued)

FOREIGN PATENT DOCUMENTS

CN 216084955 U * 2/2022
DE 597527 5/1934
(Continued)

*Primary Examiner* — Dominick L Plakkoottam
(74) *Attorney, Agent, or Firm* — Barnes & Thornburg LLP

(57) ABSTRACT

The invention relates to a fluid pump (1) for a fuel cell system. The fluid pump (1) thereby has an impeller unit (2) comprising an impeller (4), an inlet side (2a) comprising a fluid inlet (5a), and an outlet side (2b) comprising a fluid outlet (5b). In addition, the fluid pump (1) has an electric motor (6). The fluid pump (1) also has a guide channel (23) for the cooling fluid, wherein the guide channel (23) fluidically connects the inlet side (2a) and the outlet side (2b) via the impeller (4) and via the motor (6).

According to the invention, the fluid pump (1) is designed in such a way that all of the surfaces within the guide channel (23), to which the cooling fluid can be applied directly, do not separate any ions into the cooling fluid.

The invention also relates to the fuel cell system comprising the fluid pump (1).

11 Claims, 4 Drawing Sheets

(51) Int. Cl.
  *F04D 29/18* (2006.01)
  *F04D 29/58* (2006.01)
  *H01M 8/04029* (2016.01)
  *H02K 5/04* (2006.01)
  *H02K 7/08* (2006.01)
  *H02K 9/19* (2006.01)
  *H02K 11/33* (2016.01)
  *H02K 21/16* (2006.01)

(52) U.S. Cl.
  CPC .......... *H01M 8/04029* (2013.01); *H02K 5/04* (2013.01); *H02K 7/083* (2013.01); *H02K 9/19* (2013.01); *H02K 11/33* (2016.01); *H02K 21/16* (2013.01); *F05D 2230/90* (2013.01); *Y02E 60/50* (2013.01)

(58) Field of Classification Search
  CPC ...... H01M 8/04; F05D 2230/90; Y02E 60/50; H05K 7/20927
  See application file for complete search history.

(56) References Cited

U.S. PATENT DOCUMENTS

| | | | | |
|---|---|---|---|---|
| 11,469,426 | B2* | 10/2022 | Lee | B60L 58/32 |
| 2011/0129753 | A1* | 6/2011 | Na | H01M 8/04044 |
| | | | | 429/437 |
| 2012/0064426 | A1* | 3/2012 | Sato | B60L 50/51 |
| | | | | 429/434 |
| 2012/0145550 | A1* | 6/2012 | Kim | H01M 8/04044 |
| | | | | 204/628 |
| 2012/0251311 | A1 | 10/2012 | Fischer et al. | |
| 2012/0279792 | A1* | 11/2012 | Katano | B60L 50/71 |
| | | | | 180/65.31 |
| 2013/0034786 | A1* | 2/2013 | Matsumoto | H01M 8/04485 |
| | | | | 429/429 |
| 2019/0105961 | A1 | 4/2019 | Weis et al. | |
| 2019/0135124 | A1 | 5/2019 | Farber | |
| 2020/0075977 | A1* | 3/2020 | Kim | H01M 8/04044 |
| 2021/0195808 | A1 | 6/2021 | Liu et al. | |
| 2021/0254542 | A1* | 8/2021 | Englert | F01P 11/0204 |
| 2023/0207840 | A1* | 6/2023 | McClory | H01M 8/04029 |
| | | | | 429/437 |

FOREIGN PATENT DOCUMENTS

| | | |
|---|---|---|
| DE | 3536092 C2 | 1/1989 |
| DE | 102010005642 | 6/2011 |
| DE | 102017217714 | 4/2019 |
| DE | 102020130804 | 6/2021 |
| DE | 102020205172 | 10/2021 |
| EP | 3480897 | 5/2019 |
| JP | 2004-068812 | 3/2004 |

* cited by examiner

FLUID PUMP

CROSS-REFERENCE TO RELATED APPLICATIONS

This application claims priority from German Patent Application No. DE 10 2022 206 140.3, filed Jun. 20, 2022, the entirety of which is hereby fully incorporated by reference herein.

The invention relates to a fluid pump for a fuel cell system comprising at least one fuel cell stack of several fuel cells according to the preamble of claim 1. The invention also relates to the fuel cell system comprising the fluid pump.

Fluid pumps are already known from the prior art and usually comprise an impeller for conveying a fluid and an electric motor for driving the impeller. Fluid pumps can be used, for example, for cooling a fuel cell system in a heavy goods vehicle. The fuel cell system then usually has several fuel cell stacks comprising several fuel cells. The fuel cell stacks are thereby cooled by means of the conveyed fluid, wherein due to the required cooling performance, the fluid is conveyed by means of several fluid pumps. Disadvantageously, this requires a high installation space. When cooling the fuel cell stacks of the fuel cell system, there are also separate requirements on the fluid. The fluid is to in particular be dielectric and is to also remain dielectric.

It is thus the object of the invention to specify an improved or at least alternative embodiment for a fluid pump of the generic type, in the case of which the described disadvantages are overcome. It is also the object of the invention to provide a corresponding fuel cell system.

This object is solved according to the invention by means of the subject matter of the independent claims. Advantageous embodiments are subject matter of the dependent claims.

The present invention is based on the general idea of adapting the fluid pump for use in a fuel cell system in particular for applications in a heavy goods vehicle.

The fluid pump is provided for a fuel cell system comprising at least one fuel cell stack of several fuel cells. The fuel cell system is provided in particular for a heavy goods vehicle. The fluid pump thereby has an impeller unit comprising an impeller for conveying a cooling fluid. The impeller unit thereby has an inlet side comprising a fluid inlet and an outlet side comprising a fluid outlet, wherein the inlet side and the outlet side are separated from one another by means of the impeller. The fluid pump further has an electric motor comprising a shaft rotating around an axis of rotation, wherein the shaft of the electric motor is drivingly connected to the impeller of the impeller unit. In addition, the fluid pump has a guide channel for the cooling fluid comprising an impeller path and comprising a motor path, wherein the impeller path of the guide channel fluidically connects the inlet side and the outlet side via the impeller, and the motor path of the guide channel fluidically connects the inlet side and the outlet side via the motor. According to the invention, the fluid pump is designed in such a way that all of the surfaces within the guide channel, to which the cooling fluid can be applied directly, do not separate any ions into the cooling fluid.

As specified above, the guide channel has the impeller path, which fluidically connects the inlet side and the outlet side via the impeller, and the motor path, which fluidically connects the inlet side and the outlet side via the motor. The impeller path and the motor path thereby deviate from one another and are fluidically connected to one another. The impeller path thereby leads directly over the impeller of the impeller unit, so that the cooling fluid in the impeller path can be conveyed from the inlet side to the outlet side by means of the impeller. The motor path leads around the impeller of the impeller unit and connects the inlet side and the outlet side via the motor and in particular via a motor housing of the motor. The pressure difference between the inlet side and the outlet side can be used for the flow-through of the cooling fluid in the motor path. The motor path can in particular contribute to the self-cooling of the motor. The motor path can in particular be formed in a motor housing of the motor and can be fluidically separated from current-conducting components of the motor. For this purpose, the motor housing can be formed in a double-walled manner. The fluid pump can in particular be a so-called dry rotor with a jacket cooling.

It goes without saying that a separation of the ions into the cooling fluid cannot be physically ruled out completely. The number of the ions separated into the cooling fluid, however, is so small that the influence thereof on physical properties of the cooling fluid is negligibly small over a longer period of time, in particular over several months. In other words, the fluid pump is designed in such a way that all of the surfaces within the guide channel, to which the cooling fluid can be applied directly, have a reduced ion emission into the cooling fluid. The term "the surfaces, which can be applied directly" refers to surfaces, which have a direct contact with the cooling fluid during operation of the pump or around which the cooling fluid flows directly, respectively.

For this purpose, an element of the fluid pump comprising the surface, to which the cooling fluid can be applied directly, can be made, on the one hand, of a material having the reduced ion emission or can be coated with a coating having the reduced ion emission. The surfaces within the guide channel, to which the cooling fluid can be applied directly, can be formed, for example, by means of the impeller and/or an impeller housing receiving the impeller and/or a motor housing of the motor and/or at least one seal present in the fluid pump, and/or at least one bearing provided in the fluid pump. For example, the surfaces to which the cooling fluid can be applied directly, can be passivated with aluminum oxide at least in some regions. The impeller can be made, for example, in one piece and preferably of polyphenylene sulfide. On the other hand, the cooling fluid cannot be applied directly to a surface of an element of the fluid pump, which causes a high ion emission. For this purpose, the guide channel in the fluid pump can be guided around the mentioned element accordingly, and the mentioned element can optionally be cooled indirectly. For example, the guide channel can thus surround a stator and a rotor of the electric motor.

Ions can thus not be separated into the cooling fluid in the fluid pump according to the invention, and the ion emission into the cooling fluid can be controlled. The function of the fuel cell system can therefore be ensured and the service life of the fuel cell system can be increased. Expediently, the cooling fluid is dielectric or electrically non-conductive, respectively. Primarily, the cooling fluid is a liquid. The cooling fluid can be, for example, an aqueous mixture, such as water-glycol mixture. In the case of a further development of the fluid pump, the motor can have a group, to which current can be applied, comprising a rotor, which is connected in a rotationally fixed manner to the shaft, and a stator receiving the rotor. The motor can have a motor housing, and the group, to which current can be applied, can be received in the motor housing. The motor path of the guide channel can be formed within the motor housing and can be fluidically separated per se from the group to which current can be applied, by means of the motor housing. For this purpose, the motor housing can be formed, for example, in a double-walled manner at least in some regions. The cooling fluid can thus not flow around the surfaces, which cause a high ion emission, of the group, to which current can be applied, and the ion emission into the cooling fluid or the separation of ions into the cooling fluid, respectively, can thus be ruled out. The motor path of the guide channel can be guided in the motor housing in such a way that the group, to which current can be applied, is cooled indirectly and nonetheless sufficiently effectively with the cooling fluid. As already explained above, the motor housing can, for this purpose, be formed in a double-walled manner at least in some regions.

The electric motor can advantageously have a motor housing, and the guide channel can be formed at least in some regions by a cooling fluid jacket formed in the motor housing. A group of the motor, to which current can be applied, can also be cooled indirectly here by means of the cooling fluid. As already explained above, the group to which current can be applied, can have a rotor, which is connected in a rotationally fixed manner to the shaft, and a stator.

The electric motor can have a motor housing and the impeller unit can have an impeller housing. In addition, the fluid pump can have a mechanical seal, which is clamped in a sealing manner between the motor housing and the impeller housing. The mechanical seal can seal the fluid pump or the guide channel, respectively, to the outside. The mechanical seal can be made of SiC. The mechanical seal thus does not have any abrasion and thus no ion emission into the cooling fluid.

The fluid pump can have at least one bearing—preferably two bearings—for the rotating shaft, and the at least one bearing can be fluidically separated from the guide channel by means of the above-described mechanical seal. Due to the mechanical seal, the contact of the cooling fluid in the guide channel with the at least one bearing can be avoided and the service life of the respective bearing can thus be increased. The at least one bearing can be water-tight. The bearing can thus in particular withstand a slight leakage of the mechanical seal. The bearing can in particular be designed specifically for protection class IP67. For protection class IP67, the bearing has to remain tight in response to submersion of the fluid pump.

The fluid pump can advantageously have an inverter for the electric motor. The inverter can thereby be arranged on a longitudinal end of the motor located opposite the impeller unit. The motor path of the guide channel can thereby be guided adjacent to the inverter at least in some regions, so that the inverter can be cooled by the cooling fluid, which is conveyed by means of the impeller unit. The inverter can thereby be fluidically separated from the motor path of the guide channel or from the cooling fluid in the motor path of the guide channel, respectively, by means of the motor housing, so that electrical components of the inverter can be cooled indirectly by the cooling fluid. The inverter can have, for example, a control board comprising several power semiconductors, for example IGBTs, which can then be cooled by means of the cooling fluid. The motor path of the guide channel can be guided in a meander-like manner or labyrinth-like manner on the inverter in order to improve the cooling of the inverter.

The fluid pump can advantageously have an inverter for the electric motor and the electric motor can have a motor housing. The inverter can thereby be arranged so as to be located on the outside of a bottom of the motor housing and so as to transfer heat on a longitudinal end of the motor located opposite the impeller unit. The motor path of the guide channel can be guided at least in some regions on the bottom of the motor housing facing away from the inverter, so that the inverter can be cooled by the cooling fluid, which is conveyed by means of the impeller unit. The bottom can thereby be aligned transversely to the axis of rotation and can fluidically separate electrical components of the inverter from the motor path of the guide channel or from the cooling fluid in the guide channel, respectively. The electrical components of the inverter—for example, a control board comprising several power semiconductors—can then be cooled indirectly by the cooling fluid. The motor path of the guide channel can thereby be guided on the bottom in a meander-like manner or labyrinth-like manner.

In order to fluidically separate the guide channel on the bottom of the motor housing from a group of the motor, to which current can be applied, a cover can be provided on the bottom facing away from the inverter. A cover seal, which seals the motor path of the guide channel to the outside, can be arranged for intended purposes between the bottom and the cover. As already described above, the group of the motor to which current can be applied can comprise a rotor, which rotates with the shaft, and a stator.

As already described above, the fluid pump is provided for a fuel cell system. The fuel cell system can be designed or provided, respectively, in particular for a heavy goods vehicle. The fluid pump can advantageously have a maximum electric power between 4,000 W and 6,000 W, preferably 4,500 W, and/or a maximum output between 400 l/min and 700 l/min and/or a maximum pressure between 3 bar and 4 bar, preferably 3.5 bar, and/or a maximum speed between 5,000/min and 6,000/min, preferably 5,400/min, and/or a maximum torque between 6.0 Nm and 8.0 Nm. The maximum parameters specified here refer to the full-load operation of the fluid pump. The electric motor can advantageously be capable of being operated with a DC voltage between 400 V and 860 V, which is converted by means of an inverter. The electric motor can in particular be a permanent magnet synchronous motor. The impeller can advantageously have a maximum efficiency between 60% and 70%, preferably 65%.

The invention also relates to a fuel cell system comprising at least one fuel cell stack of several fuel cells for a heavy goods vehicle. The fuel cell system thereby has the above-described fluid pump. The fuel cell system preferably has one single above-described fluid pump. The fuel cell system in particular does not have any further fluid pumps, which are provided for conveying the cooling fluid to the at least one fuel cell stack. In other words, the fluid pump is designed in such a way that the cooling fluid for the entire fuel cell system can be conveyed by means of the one single fluid pump. The fuel cell system can thereby have several—in particular two—fuel cell stacks. The cooling fluid for the several fuel cell stacks can thereby be capable of being conveyed by means of the one single fluid pump. For this purpose, the fluid pump can have the above-described properties. To avoid repetitions, reference is made at this point to the above remarks.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations, or alone, without leaving the scope of the present invention.

Preferred exemplary embodiments of the invention are illustrated in the drawings and will be described in more detail in the following description, whereby identical reference numerals refer to identical or similar or functionally identical components.

IN EACH CASE SCHEMATICALLY

Figure 1:
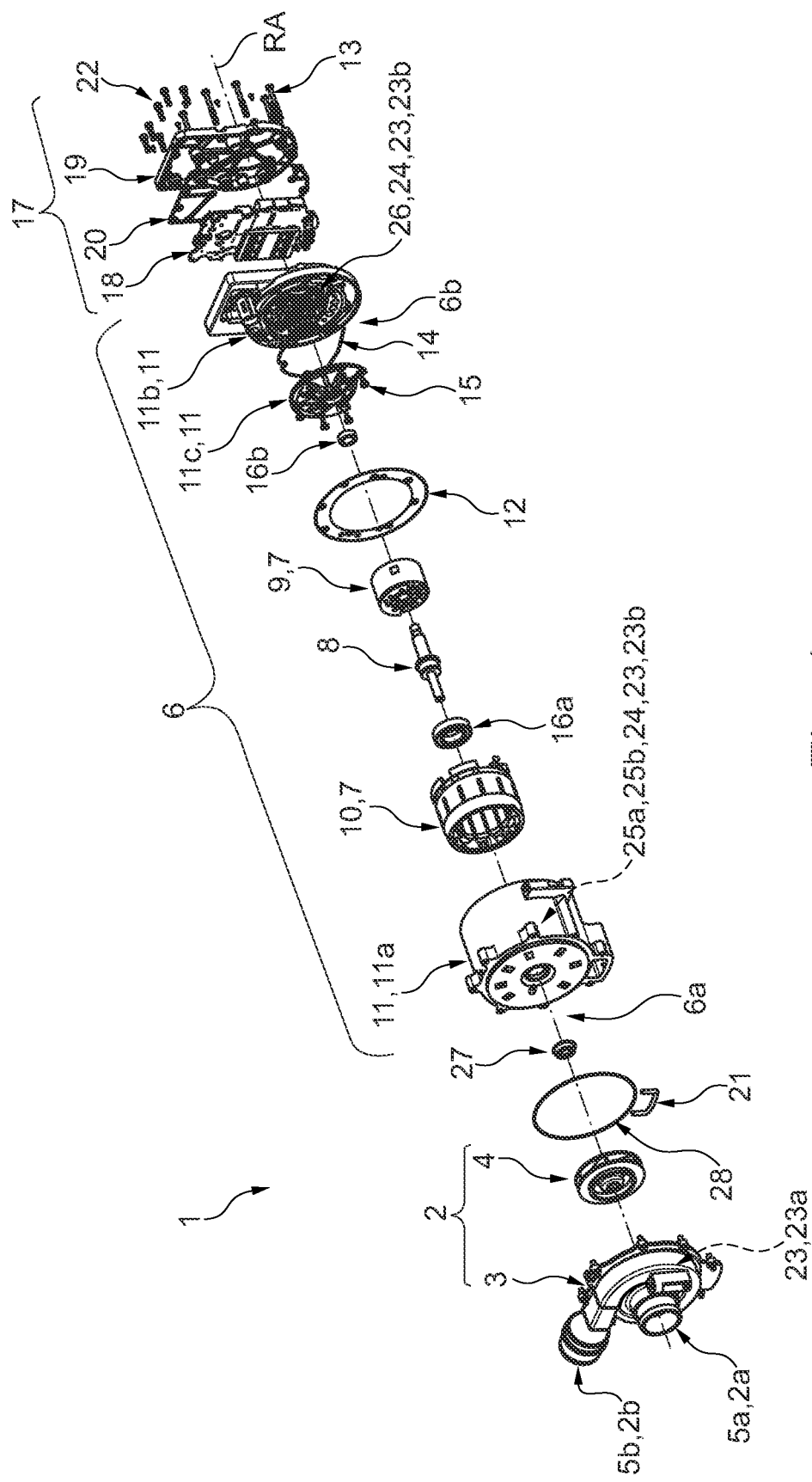
FIG. 1 shows an exploded view of a fluid pump according to the invention.

FIG. 1 shows an exploded view of a fluid pump 1 according to the invention. The fluid pump 1 is provided or designed, respectively, for a fuel cell system comprising at least one fuel cell stack of several fuel cells. The fuel cell system can in particular be provided or designed, respectively, for a heavy goods vehicle. The fluid pump 1 thereby has an impeller unit 2 comprising an impeller housing 3 and an impeller 4. The impeller 4 is made in one piece and preferably of polyphenylene sulfide. In addition, the impeller unit 2 has an inlet side 2a—or a low pressure side, respectively—comprising a fluid inlet 5a and an outlet side 2b—or a high pressure side, respectively—comprising a fluid outlet 5b. The inlet side 2a and the outlet side 2b are separated from one another or fluidically connected to one another, respectively, by means of the impeller 4. The fluid inlet 5a and the fluid outlet 5b are formed in the impeller housing 3.

In addition, the fluid pump 1 has an electric motor 6. The electric motor 6 can in particular be a permanent magnet synchronous motor. The motor 6 thereby comprises a shaft 8 rotating around an axis of rotation RA and a group 7, to which current can be applied and which has a rotor 9 firmly connected to the shaft 8 and a stator 10 receiving the rotor 9. The shaft 8 is drivingly connected to the impeller 4. Here, the axis of rotation RA corresponds to a longitudinal central axis of the fluid pump 1, and the motor 6 has two longitudinal ends 6a and 6b, which are located opposite one another with respect to the axis of rotation RA. The impeller unit 2 is arranged on the longitudinal end 6a of the motor 6.

The motor 6 further has a motor housing 11 comprising a pot-shaped housing body 11a and a bottom 11b, which is aligned transversely to the axis of rotation RA. In addition, the motor housing 11 has a housing seal 12, which is arranged or clamped in a sealing manner, respectively, between the housing body 11a and the bottom 11b and which seals the corresponding connecting point to the outside. The housing body 11a and the bottom 11b are screw-connected to one another by means of several housing screws 13. In addition, the motor housing 11 has a cover 11c, which closes the bottom 11b on the stator side or rotor side, respectively. A cover seal 14, which seals the corresponding connecting point to the outside, is arranged or clamped in a sealing manner, respectively, between the bottom 11b and the cover 11c. The bottom 11b and the cover 11c are screw-connected to one another by means of several cover screws 15.

The stator 10 is received in a rotationally fixed manner in the motor housing 11, and the shaft 8 comprising the rotor 9 is received so as to rotate in the motor housing 11. For this purpose, the fluid pump 1 has two bearings 16a and 16b, which receive the shaft 8 on the respective longitudinal ends 6a and 6b of the motor 6. In addition, an impeller seal 27 is arranged on the shaft 8 on the longitudinal end 6a.

The fluid pump 1 further has a mechanical seal 28. The mechanical seal 28 is arranged or clamped in a sealing manner, respectively, between the motor housing 11 and the impeller housing 3 and seals the corresponding connecting point to the outside. The mechanical seal 28 is preferably made of SiC. The fluid pump 1 furthermore has a U-seal 21, which is arranged or clamped in a sealing manner, respectively, between the motor housing 11 and the impeller housing 3 in the same way.

In addition, the fluid pump 1 has an inverter 17. The inverter 17 can be designed for converting a DC voltage between 400 V and 860 V for driving the motor 6. The inverter 17 is thereby arranged on the longitudinal end 6b of the motor 6 or facing away from the impeller unit 2, respectively. The inverter 17 thereby comprises a control board 18 and an inverter cover 19, wherein the control board 18 is arranged between the bottom 11b of the motor housing 11 and the inverter cover 19. In addition, the inverter 17 comprises an inverter seal 20, which is arranged or clamped in a sealing manner, respectively, between the bottom 11b and the inverter cover 19 and seals the corresponding connecting point to the outside. The bottom 11b and the inverter cover 19 are screw-connected to one another by means of several inverter screws 22.

The fluid pump 1 is designed for conveying a cooling fluid, preferably a liquid. For this purpose, the fluid pump 1 has a guide channel 23 comprising an impeller path 23a and a motor path 23b. The impeller path 23a leads from the fluid inlet 5a on the inlet side 2a to the fluid outlet 5b on the outlet side 2b via the impeller 4. The cooling fluid flows directly around the impeller 4 in the impeller path 23a and is conveyed directly from the fluid inlet 5a to the fluid outlet 5b by means of the impeller 4. The motor path 23b of the guide channel 23 is formed here in some regions by means of a cooling fluid jacket 24 formed in the motor housing 11 and leads via the motor 6 around the impeller 4. The cooling fluid in the motor path 23b does not flow directly around the impeller 4, and the flow-through of the motor path 23b is caused by the pressure difference, which is present between the fluid outlet 5b and the fluid inlet 5a.

The cooling fluid jacket 24 thereby comprises several—here seven—forward flow channels 25a and a return channel 25b in the housing body 11a and a meander-like or labyrinth-like connecting channel 26, respectively, between the bottom 11b and the cover 11c. The forward flow channels 25a thereby lead from the outlet side 2b through the housing body 11a and transition into the meander-like or labyrinth-like connecting channel 26, respectively. The connecting channel 26 opens out into the return channel which leads through the housing body 11a to the inlet side 2a. In the fluid pump 1, a cooling fluid is conveyed from the fluid inlet 5a on the inlet side 2a to the fluid outlet 5b on the outlet side 2b. From the outlet side 2b, a portion of the cooling fluid flows out of the fluid pump 1 via the fluid outlet 5b, and a portion of the cooling fluid flows into the cooling fluid jacket 24. From the cooling fluid jacket 24, the cooling fluid flows to the inlet side 2a and is conveyed to the outlet side 2b again by means of the impeller 4 together with the cooling fluid, which flows into the fluid pump via the fluid inlet 5a.

In the fluid pump 1, all of the surfaces within the guide channel 23, to which the cooling fluid can be applied directly, do not separate any ions into the cooling fluid. For this purpose, the respective element, which forms this surface, can be made of a material with a reduced ion emission or can be coated with a coating with a reduced ion emission. The respective element can thus be made, for example, of anodized aluminum. In addition, the cooling fluid is not applied directly to or flows directly around the group 7, respectively, to which current can be applied, and the ion emission into the cooling fluid is thus avoided in the fluid pump 1. The cooling fluid itself is dielectric. The fluid pump 1 is thus suitable in particular for cooling a fuel cell system.

The fuel cell system can in particular be provided for a heavy goods vehicle. In this case, the fluid pump 1 can be designed in such a way that the one single fluid pump 1 is sufficient for cooling the fuel cell system even with several fuel cells tacks. The fluid pump can thus have a maximum electric power between 4,000 W and 6,000 W, preferably 4,500 W, and/or a maximum output between 400 l/min and 700 l/min and/or a maximum pressure between 3 bar and 4 bar, preferably 3.5 bar, and/or a maximum speed between 5,000/min and 6,000/min, preferably 5,400/min, and/or a maximum torque between 6.0 Nm and 8.0 Nm. The impeller 4 can have a maximum efficiency between 60% and 70%, preferably 65%.

Figure 2:
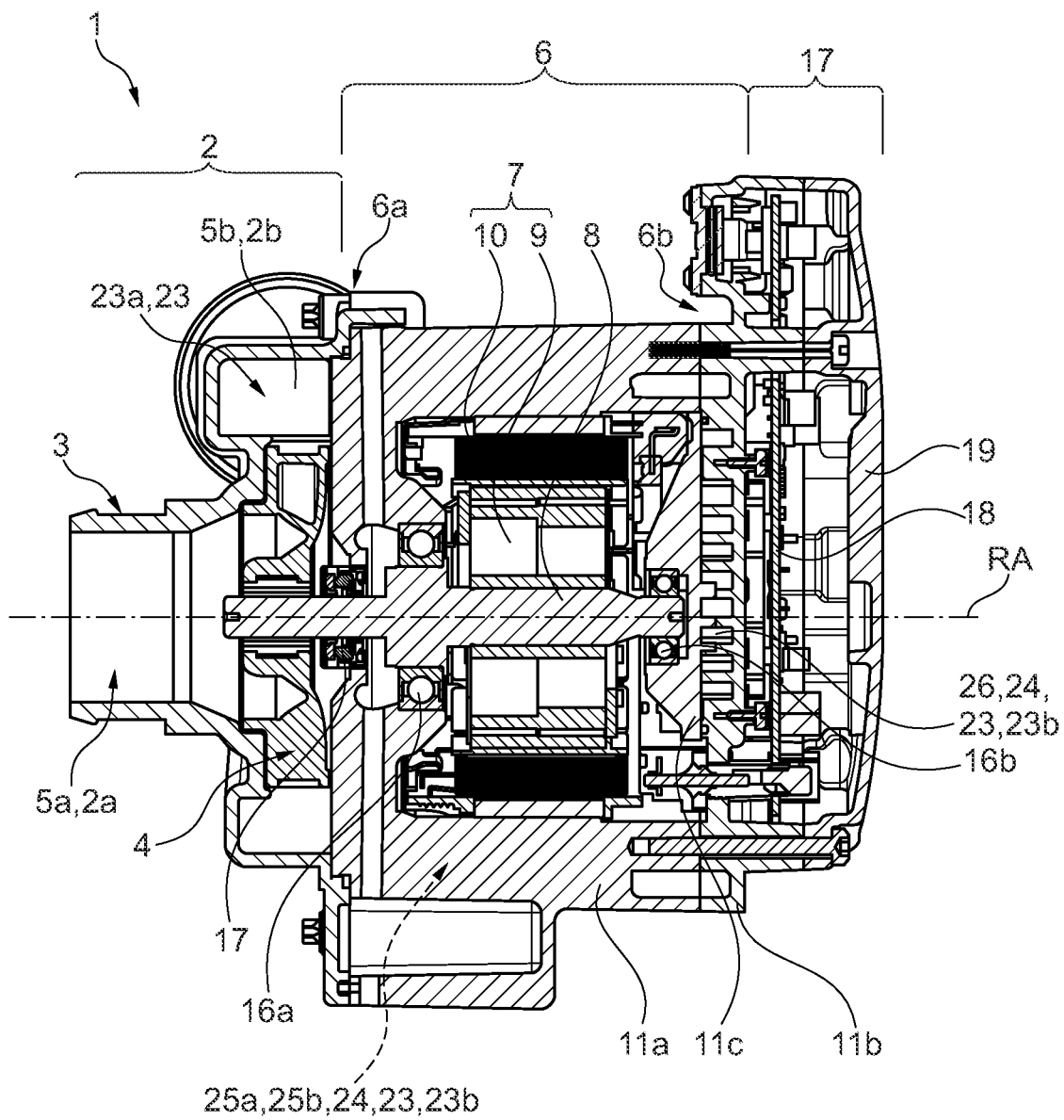
FIG. 2 shows a sectional view of the fluid pump according to the invention.
Figure 3:
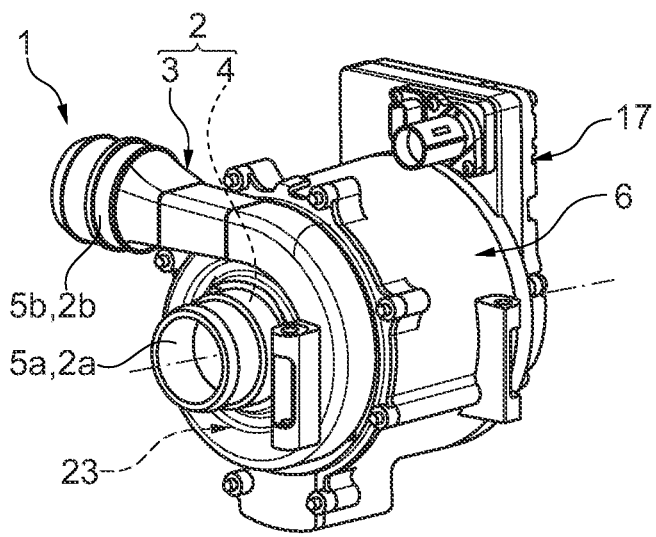
FIG. 3-8 show different views of the fluid pump according to the invention.
Figure 4:
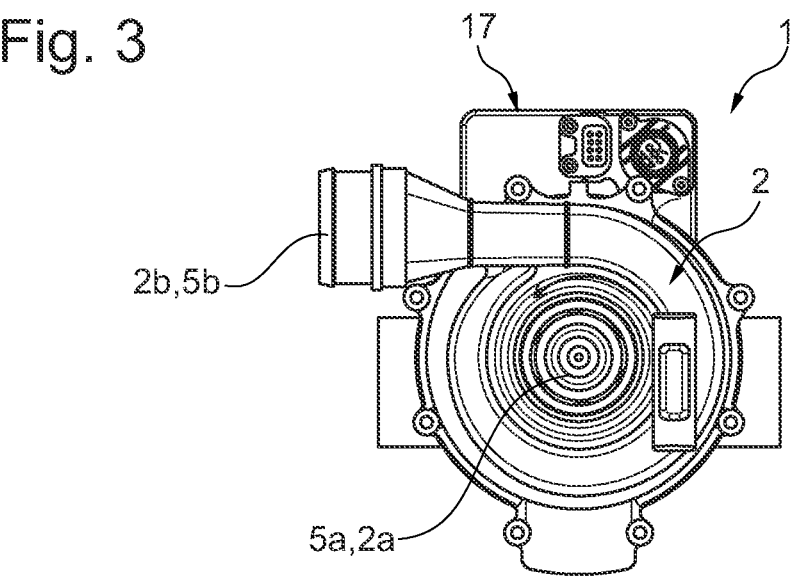
Figure 5:
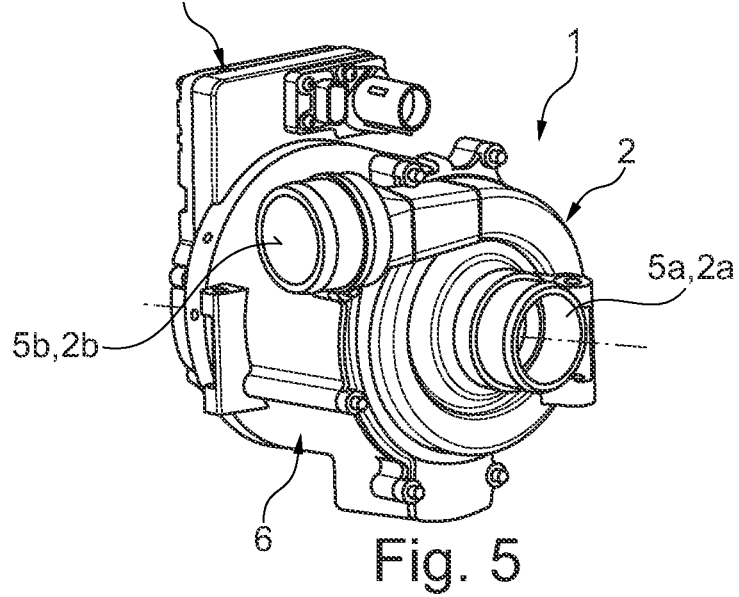
Figure 6:
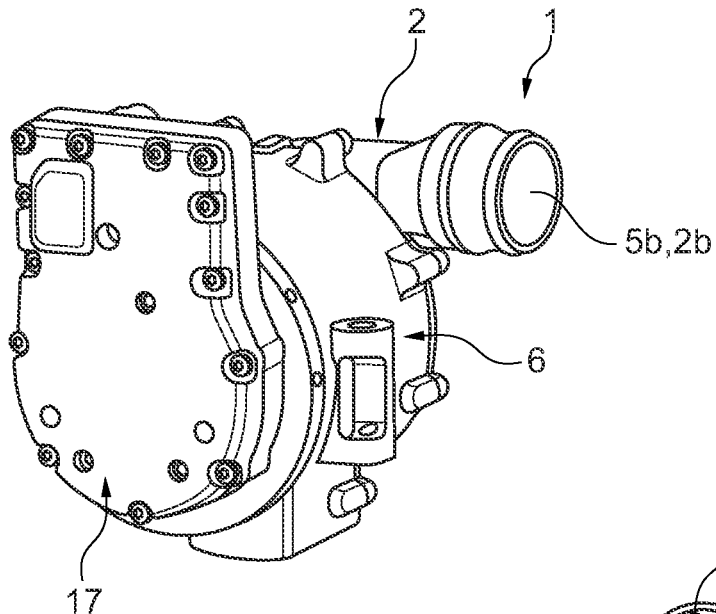
Figure 7:
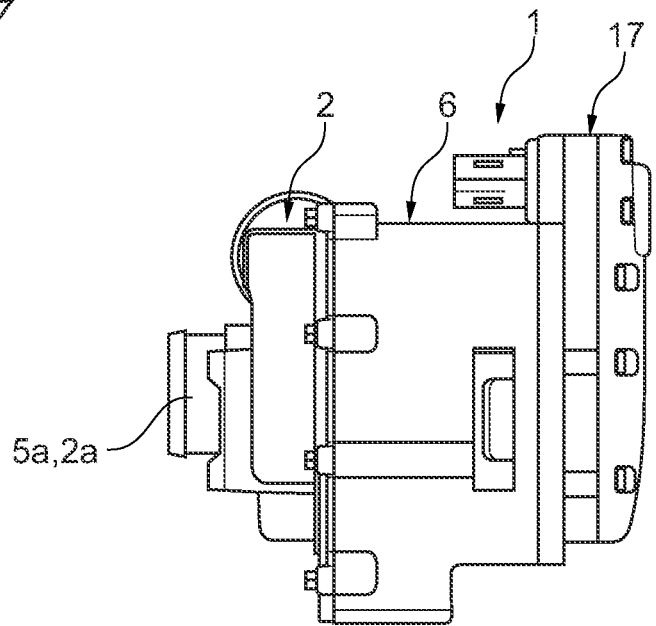
Figure 8:
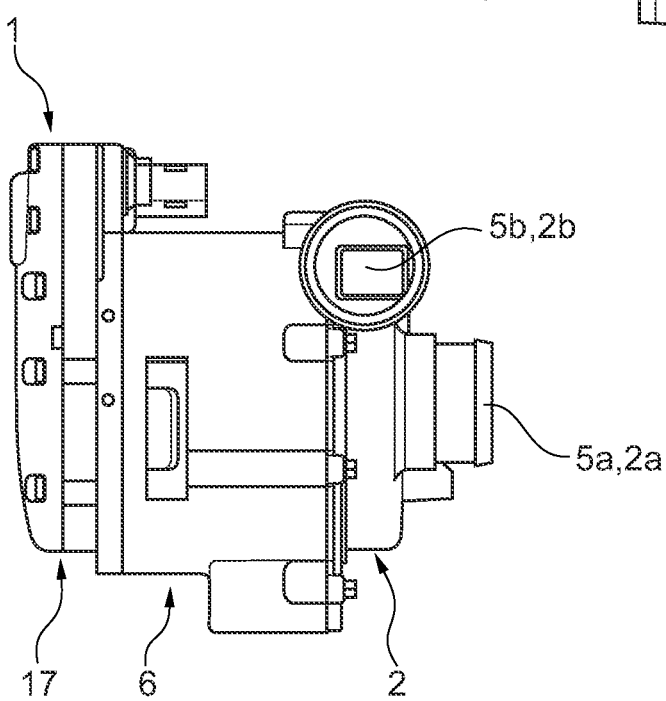

FIG. 2 shows a sectional view of the fluid pump 1 according to the invention. In particular the meander-like or labyrinth-like connecting channel 26 of the cooling fluid jacket 24 between the bottom 11*b* and the cover 11*c* of the motor housing 11 can be seen in FIG. 2. FIG. 3 to FIG. 8 show different views of the fluid pump 1. The fluid pump 1 is shown in the assembled state in FIG. 3 to FIG. 8.

This specification can be readily understood with reference to the Numbered Paragraphs provided below:

Numbered Paragraph 1. A fluid pump (1) for a fuel cell system comprising at least one fuel cell stack of several fuel cells,
wherein the fluid pump (1) has an impeller unit (2) comprising an impeller (4) for conveying a cooling fluid,
wherein the impeller unit (2) has an inlet side (2*a*) comprising a fluid inlet (5*a*) and an outlet side (2*b*) comprising a fluid outlet (5*b*),
wherein the inlet side (2*a*) and the outlet side (2*b*) are separated from one another by means of the impeller (4),
wherein the fluid pump (1) has an electric motor (6) comprising a shaft (8) rotating around an axis of rotation (RA),
wherein the shaft (8) of the electric motor (6) is drivingly connected to the impeller (4) of the impeller unit (2),
wherein the fluid pump (1) has a guide channel (23) for the cooling fluid comprising an impeller path (23*a*) and comprising a motor path (23*b*),
wherein the impeller path (23*a*) of the guide channel (23) fluidically connects the inlet side (2*a*) and the outlet side (2*b*) via the impeller (4), and the motor path (23*b*) of the guide channel (23) fluidically connects the inlet side (2*a*) and the outlet side (2*b*) via the motor (6),
characterized in that the fluid pump (1) is designed in such a way that all of the surfaces within the guide channel (23), to which the cooling fluid can be applied directly, do not separate any ions into the cooling fluid.

Numbered Paragraph 2. The fluid pump according to Numbered Paragraph 1, characterized in
that the surfaces, to which the cooling fluid can be applied directly, are passivated with aluminum oxide at least in some regions, and/or
that the impeller (4) is made in one piece and preferably of polyphenylene sulfide.

Numbered Paragraph 3. The fluid pump according to either Numbered Paragraph 1 or 2,
characterized in
that the motor (6) has a group (7), to which current can be applied, comprising a rotor (9), which is connected in a rotationally fixed manner to the shaft (8), and a stator (10),
that the motor (6) has a motor housing (11), and the group (7), to which current can be applied, is received in the motor housing (11), and
that the motor path (23*b*) of the guide channel (23) is formed within the motor housing (11) and is fluidically separated from the group (7), to which current can be applied, by means of the motor housing (11).

Numbered Paragraph 4. The fluid pump according to one of the preceding Numbered Paragraphs,
characterized in
that the electric motor (6) has a motor housing (11), and the motor path (23*b*) of the guide channel (23) is formed at least in some regions by a cooling fluid jacket (24) formed in the motor housing (11).

Numbered Paragraph 5. The fluid pump according to one of the preceding Numbered Paragraphs,
characterized in
that the electric motor (6) has a motor housing (11) and the impeller unit (2) has an impeller housing (3), and
that the fluid pump (1) has a mechanical seal (28), which is clamped in a sealing manner between the motor housing (11) and the impeller housing (3).

Numbered Paragraph 6. The fluid pump according to Numbered Paragraph 5, characterized in
that the mechanical seal (28) is made of SiC.

Numbered Paragraph 7. The fluid pump according to Numbered Paragraph 5 or 6, characterized in
that the fluid pump (1) has at least one bearing (16*a*, 16*b*) for the rotating shaft (8), and the at least one bearing (16*a*, 16*b*) is fluidically separated from the impeller path (23*a*) of the guide channel (23) by means of the mechanical seal (28), and/or
that the fluid pump (1) has at least one bearing (16*a*, 16*b*) for the rotating shaft (8) and the at least one bearing (16*a*, 16*b*) is water-tight.

Numbered Paragraph 8. The fluid pump according to one of the preceding Numbered Paragraphs,
characterized in
that the fluid pump (1) has an inverter (17) for the electric motor (6), wherein the inverter (17) is arranged on a longitudinal end (6*b*) of the motor (6) located opposite the impeller unit (2), and
that the motor path (23*b*) of the guide channel (23) is guided adjacent to the inverter (17) at least in some regions, preferably in a meander-like or labyrinth-like manner, so that the inverter (17) can be cooled by the cooling fluid, which is conveyed by means of the impeller unit (2).

Numbered Paragraph 9. The fluid pump according to one of Numbered Paragraphs 1 to 7,
characterized in
that the fluid pump (1) has an inverter (17) for the electric motor (6) and the electric motor (6) has a motor housing (11), and
that the inverter (17) is arranged so as to be located on the outside of a bottom (11*b*) of the motor housing (11), which is aligned transversely to the axis of rotation (RA), and so as to transfer heat on a longitudinal end (6*b*) of the motor (6) located opposite the impeller unit (2), and that the motor path (23b) of the guide channel (23) is guided at least in some regions, preferably in a meander-like or labyrinth-like manner, on the bottom (11b) of the motor housing (11) facing away from the inverter (17), so that the inverter (17) can be cooled by the cooling fluid, which is conveyed by means of the impeller unit (2).

Numbered Paragraph 10. The fluid pump according to one of the preceding Numbered Paragraphs, characterized in that the fluid pump (1) has a maximum electric power between 4,000 W and 6,000 W, preferably 4,500 W, and/or a maximum output between 400 l/min and 700 l/min and/or a maximum pressure between 3 bar and 4 bar, preferably 3.5 bar, and/or a maximum speed between 5,000/min and 6,000/min, preferably 5,400/min, and/or a maximum torque between 6.0 Nm and 8.0 Nm, and/or that the electric motor (6) can be operated with a DC voltage between 400 V and 860 V, which is converted by means of an inverter (17) and/or the electric motor (6) is a permanent magnet synchronous motor, and/or that the impeller (4) has a maximum efficiency between 60% and 70%, preferably 65%.

Numbered Paragraph 11. A fuel cell system comprising at least one fuel cell stack of several fuel cells for a heavy goods vehicle, wherein the fuel cell system has the fluid pump (1) according to one of the preceding Numbered Paragraphs.

The invention claimed is:

1. A fluid pump for a fuel cell system comprising at least one fuel cell stack of several fuel cells,
   wherein the fluid pump has an impeller unit comprising an impeller for conveying a cooling fluid,
   wherein the impeller unit has an inlet side comprising a fluid inlet and an outlet side comprising a fluid outlet,
   wherein the inlet side and the outlet side are separated from one another by means of the impeller,
   wherein the fluid pump has an electric motor comprising a shaft rotating around an axis of rotation,
   wherein the shaft of the electric motor is drivingly connected to the impeller of the impeller unit,
   wherein the fluid pump has a guide channel for the cooling fluid comprising an impeller path and comprising a motor path,
   wherein the impeller path of the guide channel fluidically connects the inlet side and the outlet side via the impeller, and the motor path of the guide channel fluidically connects the inlet side and the outlet side via the motor,
   characterized in
   that the fluid pump is designed in such a way that all of the surfaces within the guide channel, to which the cooling fluid can be applied directly, do not separate any ions into the cooling fluid.

2. The fluid pump according to claim 1, characterized in—that the surfaces, to which the cooling fluid can be applied directly, are passivated with aluminum oxide at least in some regions, and/or—that the impeller is made in one piece and of polyphenylene sulfide.

3. The fluid pump according to claim 1,
   characterized in
   that the motor has a group, to which current can be applied, comprising a rotor, which is connected in a rotationally fixed manner to the shaft, and a stator,
   that the motor has a motor housing, and the group, to which current can be applied, is received in the motor housing, and
   that the motor path of the guide channel is formed within the motor housing and is fluidically separated from the group, to which current can be applied, by means of the motor housing.

4. The fluid pump according to claim 1,
   characterized in that the electric motor has a motor housing, and the motor path of the guide channel is formed at least in some regions by a cooling fluid jacket formed in the motor housing.

5. The fluid pump according to claim 1,
   characterized in
   that the electric motor has a motor housing and the impeller unit has an impeller housing, and
   that the fluid pump has a mechanical seal, which is clamped in a sealing manner between the motor housing and the impeller housing.

6. The fluid pump according to claim 5, characterized in that the mechanical seal is made of SiC.

7. The fluid pump according to claim 5,
   characterized in
   that the fluid pump has at least one bearing for the rotating shaft, and the at least one bearing is fluidically separated from the impeller path of the guide channel by means of the mechanical seal, and/or
   that the fluid pump has at least one bearing for the rotating shaft and the at least one bearing is watertight.

8. The fluid pump according to claim 1, characterized in—that the fluid pump has an inverter for the electric motor, wherein the inverter is arranged on a longitudinal end of the motor located opposite the impeller unit, and—that the motor path of the guide channel is guided adjacent to the inverter at least in some regions, in a meandering or labyrinthine manner, so that the inverter can be cooled by the cooling fluid, which is conveyed by means of the impeller unit.

9. The fluid pump according to claim 1, characterized in—that the fluid pump has an inverter for the electric motor and the electric motor has a motor housing, and—that the inverter is arranged so as to be located on the outside of a bottom of the motor housing, which is aligned transversely to the axis of rotation, and so as to transfer heat on a longitudinal end of the motor located opposite the impeller unit, and—that the motor path of the guide channel is guided at least in some regions, in a meandering or labyrinthine manner, on the bottom of the motor housing facing away from the inverter, so that the inverter can be cooled by the cooling fluid, which is conveyed by means of the impeller unit.

10. The fluid pump according to claim 1, characterized in—that the fluid pump has a maximum electric power between 4,000 W and 6,000 W, and/or a maximum output between 400 l/min and 700 l/min and/or a maximum pressure between 3 bar and 4 bar, and/or a maximum speed between 5,000/min and 6,000/min, and/or a maximum torque between 6.0 Nm and 8.0 Nm, and/or—that the electric motor can be operated with a DC voltage between 400 V and 860 V, which is converted by means of an inverter and/or the electric motor is a permanent magnet synchronous motor, and/or—that the impeller has a maximum efficiency between 60% and 70%.

11. A fuel cell system comprising at least one fuel cell stack of several fuel cells for a heavy goods vehicle, wherein the fuel cell system has the fluid pump according to claim 1.

\* \* \* \* \*